United States Patent
Jensen et al.

(10) Patent No.: US 9,160,170 B2
(45) Date of Patent: Oct. 13, 2015

(54) ACTIVE DESYNCHRONIZATION OF SWITCHING CONVERTERS

(75) Inventors: Kim Hoej Jensen, Faxe (DK); Michael Jensen, Viborg (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 725 days.

(21) Appl. No.: 13/356,871

(22) Filed: Jan. 24, 2012

(65) Prior Publication Data

US 2012/0193991 A1    Aug. 2, 2012

(30) Foreign Application Priority Data

Feb. 1, 2011  (EP) ..................................... 11152893

(51) Int. Cl.
| | |
|---|---|
| H01H 9/54 | (2006.01) |
| H01H 85/46 | (2006.01) |
| H01H 35/00 | (2006.01) |
| H02J 3/46 | (2006.01) |
| H02P 9/00 | (2006.01) |
| G05D 3/12 | (2006.01) |
| H02J 3/24 | (2006.01) |
| H02J 3/01 | (2006.01) |
| H02J 3/38 | (2006.01) |

(52) U.S. Cl.
CPC ... *H02J 3/24* (2013.01); *H02J 3/01* (2013.01); *H02J 3/386* (2013.01); *Y02E 10/725* (2013.01); *Y02E 10/763* (2013.01); *Y02E 40/40* (2013.01); *Y10T 307/718* (2015.04)

(58) Field of Classification Search
CPC ..... H02P 9/02; H02P 2101/15; Y10T 307/74; Y10T 307/766; Y10T 307/826; Y10T 307/832; Y10T 307/858
USPC ............. 307/112, 116, 125, 126, 130, 153, 307/154–156; 700/287
See application file for complete search history.

(56) References Cited

U.S. PATENT DOCUMENTS

| | | | | |
|---|---|---|---|---|
| 5,225,712 A | * | 7/1993 | Erdman ........................ | 290/44 |
| 5,798,631 A | * | 8/1998 | Spee et al. .................... | 322/25 |

(Continued)

FOREIGN PATENT DOCUMENTS

| | | |
|---|---|---|
| CN | 101309012 A | 11/2008 |
| EP | 1914420 A1 | 4/2008 |

(Continued)

OTHER PUBLICATIONS

Chen Zhe, Guerrero Josep M., "A Review of the State of the Art of Power Electronics for Wind Turbines", IEEE Transactions on Power Electronics, vol. 24, No. 8, Aug. 2009, IEEE.*

(Continued)

*Primary Examiner* — Crystal J Barnes-Bullock

(57) ABSTRACT

A power generator park provided, which includes at least two power generator devices. Each power generator device has a switching converter for providing an electrical output power. A central controller is provided for providing switching parameter settings to the switching converters. Each of the at least two power generator devices further includes a timing unit for receiving a common time signal. The switching converter of each of the at least two power generator devices is configured for controlling at least one switching parameter in response to the respective switching parameter setting with a temporal coordination based on the common time signal.

10 Claims, 1 Drawing Sheet

(56) References Cited

U.S. PATENT DOCUMENTS

| | | | |
|---|---|---|---|
| 6,044,311 A * | 3/2000 | Larramendy et al. | 701/10 |
| 6,134,124 A * | 10/2000 | Jungreis et al. | 363/34 |
| 6,281,595 B1 * | 8/2001 | Sinha et al. | 290/40 A |
| 6,618,648 B1 * | 9/2003 | Shirota et al. | 700/291 |
| 6,724,097 B1 * | 4/2004 | Wobben | 290/44 |
| 6,751,573 B1 * | 6/2004 | Burch | 702/178 |
| 6,784,634 B2 * | 8/2004 | Sweo | 318/727 |
| 7,166,928 B2 * | 1/2007 | Larsen | 290/55 |
| 7,482,767 B2 * | 1/2009 | Tether | 318/139 |
| 7,605,487 B2 * | 10/2009 | Barton et al. | 290/44 |
| 7,675,897 B2 * | 3/2010 | Corcoran | 370/349 |
| 7,755,209 B2 * | 7/2010 | Jones et al. | 290/44 |
| 7,821,162 B2 * | 10/2010 | Gonzalez et al. | 307/156 |
| 7,830,030 B2 * | 11/2010 | Altemark | 290/44 |
| 7,887,292 B2 * | 2/2011 | Kuhlmeier | 416/1 |
| 8,020,021 B2 * | 9/2011 | Bengtson | 713/375 |
| 8,084,875 B2 * | 12/2011 | Letas | 290/44 |
| 8,090,972 B2 * | 1/2012 | Bengtson et al. | 713/400 |
| 8,217,533 B2 * | 7/2012 | Jones et al. | 307/82 |
| 8,264,209 B2 * | 9/2012 | Kretschmann | 322/25 |
| 8,295,988 B2 * | 10/2012 | Yasugi | 700/287 |
| 8,316,716 B2 * | 11/2012 | Kuhlmeier | 73/660 |
| 2004/0164718 A1 * | 8/2004 | McDaniel et al. | 323/211 |
| 2005/0040655 A1 * | 2/2005 | Wilkins et al. | 290/44 |
| 2005/0286179 A1 * | 12/2005 | Huff et al. | 361/20 |
| 2006/0255594 A1 * | 11/2006 | Larsen | 290/44 |
| 2007/0121354 A1 * | 5/2007 | Jones et al. | 363/47 |
| 2007/0228838 A1 * | 10/2007 | Delmerico et al. | 307/84 |
| 2007/0273155 A1 | 11/2007 | Buecker | |
| 2008/0284252 A1 * | 11/2008 | Jones et al. | 307/82 |
| 2009/0096211 A1 * | 4/2009 | Stiesdal | 290/44 |
| 2009/0204266 A1 * | 8/2009 | Lovmand et al. | 700/287 |
| 2010/0268849 A1 * | 10/2010 | Bengtson et al. | 709/248 |
| 2010/0299550 A1 * | 11/2010 | Bengtson | 713/375 |
| 2011/0112697 A1 * | 5/2011 | Arinaga et al. | 700/287 |
| 2012/0133211 A1 * | 5/2012 | Jones et al. | 307/82 |
| 2012/0169053 A1 * | 7/2012 | Tchoryk et al. | 290/44 |
| 2012/0205981 A1 * | 8/2012 | Varma et al. | 307/64 |
| 2012/0274937 A1 * | 11/2012 | Hays et al. | 356/337 |
| 2012/0310559 A1 * | 12/2012 | Taft | 702/62 |

FOREIGN PATENT DOCUMENTS

| | | |
|---|---|---|
| WO | WO 0120745 A1 * | 3/2001 |
| WO | WO 03077398 A2 | 9/2003 |
| WO | WO 2005027301 A1 * | 3/2005 |
| WO | WO 2006068495 A2 | 6/2006 |

OTHER PUBLICATIONS

N. Pogaku, T. C. Green: Application of Inverter-Based Distributed Generators for Harmonic Damping Throughout a Distribution Network, Power Electronics Specialists Conference 2005, Piscataway, USA, Jan. 1, 2005, pp. 1922-1927, XP031000406; Others.
Communication from European Patent Office, Jun. 21, 2011, pp. 1-7.

* cited by examiner

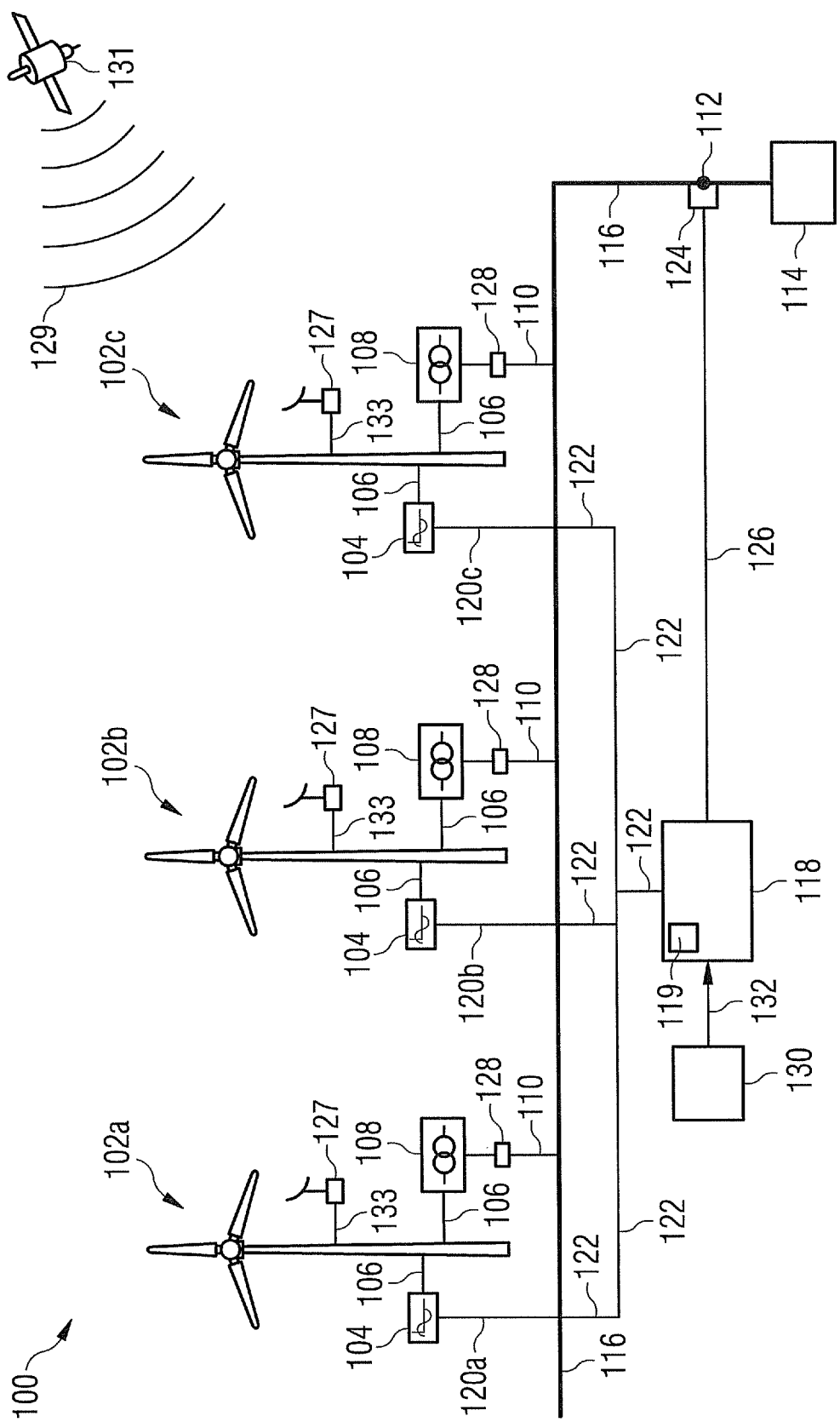

ACTIVE DESYNCHRONIZATION OF SWITCHING CONVERTERS

CROSS REFERENCE TO RELATED APPLICATIONS

This application claims priority of European Patent Office application No. 11152893.1 EP filed Feb. 1, 2011. All of the applications are incorporated by reference herein in their entirety.

FIELD OF INVENTION

The present invention relates to the field of a power generator park and in particular to a power generator park having power generator devices which comprise a switching converter.

ART BACKGROUND

Harmonic disturbance is one of the disadvantages of using a frequency converter in power generation. The switching circuit of the frequency converter is one of the main sources of generating harmonic oscillations. Several measures for reducing said harmonic impact are known, e.g. grid filters, increasing the switching frequency, or paring of a number of turbines by optic fibre in order to desynchronize switching phases between the turbines. However, the known measures have at least one of the disadvantages of being expensive, increasing electrical losses or being limited in physical range in the case of paring turbines.

In view of the above-described situation, there exists a need for an improved technique that enables to provide a power generator park with at least two power generator devices, while substantially avoiding or at least reducing one or more of the above-identified problems.

SUMMARY OF INVENTION

This need may be met by the subject-matter according to the independent claims. Advantageous embodiments of the herein disclosed subject-matter are described by the dependent claims.

According to a first aspect of the herein disclosed subject-matter, there is provided a power generator park comprising at least two power generator devices including a first power generator device and a second power generator device, wherein each power generator device comprises a switching converter for providing an electrical output power. The power generator park further comprises a central controller for providing a first switching parameter setting to the switching converter of the first power generator device and a second switching parameter setting to the switching converter of the second power generator device, wherein each of the at least two power generator devices further comprises a timing unit for receiving a common time signal. The switching converter of each of the at least two power generator devices is configured for controlling at least one switching parameter in response to the respective switching parameter setting with a temporal coordination which is based on the common time signal.

This aspect is based on the idea that by providing a common time signal and therefore a common time base, the switching parameter settings can be temporarily coordinated. Hence, in an embodiment this idea allows to coordinate the respective switching parameter settings such that the harmonic disturbance generated by each of the power generator devices is reduced by the harmonic disturbance of one or more other power generator devices of the power generator park. However, such a damping effected by the temporal coordination of the switching parameter settings of the individual power generator devices requires a very accurate time base on which the temporal coordination is performed. To this end, the timing unit is provided for each power generator device to provide the common time base by means of the common time signal.

Generally herein, the term "common time signal" includes a single signal or, in other embodiments, a plurality of signals which is (are) received from a single source or from a plurality of sources. Further, the term "common time signal" is to be interpreted in a broad sense, covering the common time signal in any form that allows to reconstruct extract a common time base from the common time signal.

According to an embodiment, the timing unit comprises a global positioning system (GPS) receiver. In such a case, a common time base is derived from the common time signal which is provided in the form of at least one global positioning signal transmitted by a global positioning system. Since the calculation of the position of an object by means of the global positioning system requires an accurate common time base, this accurate common time base can also be used for desynchronizing the switching parameter settings and, finally, the switching operation of the switching converters in accordance with the herein disclosed subject-matter.

However, it should be understood that other sources of a common time signal or a common time base can be used according to embodiments of the herein disclosed subject-matter. Another example of a common time signal is the time signal emitted from an atomic clock or a time signal provided according to the known network time protocol (NTP) or the precision time protocol (PTP), which is defined in the IEEE 1588 standard. However, the GPS system provides a highly accurate time base and is available in almost any location around the world at low cost.

According to an embodiment, the power generator park further comprises a measuring unit for measuring a harmonic disturbance in an output power of the power generator park. The measuring unit is further configured for providing in response to the measured harmonic disturbance a disturbance signal. According to an embodiment, the central controller is configured for providing the first switching parameter setting and the second switching parameter setting depending on the disturbance signal to thereby reduce the harmonic disturbance in the output power. Hence, by appropriate temporal coordination of the switching parameter settings of different power generator devices a damping of the harmonic disturbance can be effected. Further, in an embodiment, the measuring provides a closed loop system in which the central controller may be configured for adapting the switching parameters in response to the measured harmonic disturbance so as to minimize or at least reduce the harmonic disturbance in the output power provided by the power generator park. Other embodiments of the herein disclosed subject matter are open loop systems.

According to a further embodiment, each power generator device or at least some of the power generator devices may comprise an impedance determination unit for determining an impedance acting on the switching converter of the respective power generator device. In an embodiment the impedance determination unit is configured for calculating the impedance acting on the switching converter by using measurements of voltage, current and phase in the turbines and at the access point. In an embodiment, the impedance determination unit comprises measuring subunits for measuring the voltage, current and phase in the turbines and at the access point. Further, in an embodiment the central controller is configured for providing the switching parameter settings, e.g. the first switching parameter setting and the second switching parameter setting, to the respective one of the at least two power generator devices depending on the impedance acting on its switching converter.

For example, in an embodiment, the first power generator device and the second power generator device each comprise a measuring unit for measuring the impedance at the switching converter of the first power generator device and the second power generator device, respectively. Further, in an embodiment the central controller is configured for providing the first switching parameter setting depending on the impedance at the switching converter of the first power generator device and for providing the second switching parameter setting depending on the impedance at the switching converter of the second power generator device. Taking into account the impedances at the switching converters the distribution strategy, which defines the temporal coordination of the individual frequency converters, can be optimized. In an embodiment, the distribution strategy defines which converter is operated at which load and with which switching parameter setting. For example, if a switching converter provides a high power due to a low impedance at an output thereof, the harmonic disturbance of this switching converter is assumed to be relatively high. In such a case, the harmonic disturbance of a switching converter with a high power output can be at least partially compensated by respective switching parameter setting and the temporal coordination thereof for two or more other switching converters.

According to a further embodiment, the power generator park comprises an activity unit which provides an activity signal indicating which power generator devices of the at least two power generator devices are in an active state in which the power generator devices produce output power. For example, depending on the need for electrical energy in the grid one or more power generator devices may be set to an inactive state in which the power generator devices do not produce output power. Other reasons for inactive power generator devices are for example maintenance, darkness in the case of a solar power generator device or still air in the case of a wind turbine device. According to an embodiment, the central controller is configured for providing the switching parameter settings depending on the activity signal. In other words, in embodiments of the herein disclosed subject-matter the central controller takes into account whether or not one or more of the power generator devices of the power generator park are in an inactive state. For example, in an embodiment the activity signal is used for optimizing the temporal coordination strategy of the individual switching converters of the active power generator devices.

Generally herein, the switching converter may be any type of converter which generates electrical energy at an output thereof by a switching activity. Any such switching activity may lead to a harmonic disturbance in the output power generated by the switching converter. For example, in an embodiment, the switching converter is a frequency converter.

According to an embodiment, the power generator park is a wind park and each power generator device is a wind turbine device. In particular with wind turbine devices which are spaced from each other by a relatively far distance, the use of a timing unit which comprises a global positioning system receiver is advantageous, since the global positioning system receiver is not involved in higher costs if the individual power generator devices are spaced by a larger distance.

According to a second aspect of the herein disclosed subject-matter, a method of operating a central controller of a power generator park is provided, wherein the power generator park comprises at least two power generator devices including a first power generator device and a second power generator device, and wherein each power generator device comprises a switching converter for providing an electrical output power. The method according to the second aspect comprises providing a first switching parameter setting for the switching converter of the first power generator device and a second switching parameter setting for the switching converter of the second power generator device, wherein the switching parameter settings include a reference to a common time base.

Hence, according to embodiments of the herein disclosed subject-matter, the switching parameter settings include a reference to a common time base, which in turn requires an accurate common time base because of the short time intervals which are relevant in the switching operation of switching converters used in power generator devices.

According to an embodiment of the second aspect, the method further comprises receiving a disturbance signal indicative of a harmonic disturbance in an output power of the power generator park and providing the first switching parameter setting and the second switching parameter setting depending on the disturbance signal to thereby reduce the harmonic disturbance in the output power. It should be understood, that in the above-described embodiment reference to a first and second switching parameter setting is merely exemplary and that according to other embodiments three or more switching parameter settings may be provided in accordance with embodiments of a method according to the second aspect.

According to a further embodiment of a method of operating a central controller of a power generator park, the method comprises receiving for each of the at least two power generator devices an impedance signal indicative of an impedance acting on the switching converter of the power generator device and providing the switching parameter settings depending on the impedance acting on the switching converters of the at least two power generator devices.

According to a further embodiment, the method according to the second aspect further comprises receiving an activity signal indicating which power generator devices of the at least two power generator devices are in an active output power producing state and providing the switching parameter settings depending on the activity signal.

It should be understood that elements, signals or entities described with regard to the first aspect may also be employed with embodiments of the method disclosed herein with regard to the second aspect. Further it should be understood that the advantages specified with regard to the first aspect are also valid for corresponding features of the second aspect.

According to a third aspect of the herein disclosed subject-matter, a computer program for providing a physical object, namely a switching parameter setting is provided, the computer program, when being executed by a data processor device, is adapted for controlling the method as set forth with regard to the second aspect or an embodiment thereof.

As used herein, reference to a computer program is intended to be equivalent to a reference of a program element and/or a computer-readable medium containing instructions for controlling a computer system or a data processor device to coordinate the performance of the above-described method.

The computer program may be implemented as a computer-readable instruction code by use of any suitable programming language, such as, for example, Java, C++, and may be stored on a computer-readable medium (removable disk, volatile or non-volatile memory, embedded memory/processor, etc.). The instruction code is operable to program a computer or any other programmable device to carry out the intended functions as described herein. The computer program may be available from a network, such as the World-WideWeb, from which it may be downloaded.

Embodiments, elements, units, or other entities as described with regard to the herein disclosed subject-matter, may be realized by means of a computer program respectively software. However, according to other embodiments, such elements, units, or other entities may be realized by one or more specific electronic circuits respectively hardware. Furthermore, according to other embodiments of the herein disclosed subject-matter such elements, units or entities may be realized in a hybrid faun, i.e. in a combination of software modules and hardware modules.

In the above there have been described and in the following there will be described exemplary embodiments of the herein disclosed subject-matter with reference to a power generator park and a method of operating a central controller of a power generator park. It has to be pointed out that of course any combination of features relating to different aspects of the herein disclosed subject-matter is also possible. In particular, some embodiments have been described with reference to apparatus type claims whereas other embodiments have been described with reference to method type claims. However, a person skilled in the art will gather from the above and the following description that, unless otherwise notified, in addition to any combination of features belonging to one aspect also any combination between features relating to different aspects or embodiments, for example even between features of the apparatus type claims and features of the method type claims is considered to be disclosed with this application.

The aspects and embodiments defined above and further aspects and embodiments of the herein disclosed subject-matter are apparent from the examples to be described hereinafter and are explained with reference to the drawings but to which the invention is not limited.

BRIEF DESCRIPTION OF THE DRAWINGS

FIG. 1 shows a power generator park in accordance with embodiments of the herein disclosed subject-matter.

DETAILED DESCRIPTION OF INVENTION

FIG. 1 shows a power generator park in the form of a wind park 100 in accordance with embodiments of the herein disclosed subject-matter.

In accordance with an embodiment shown in FIG. 1, the power generation devices of the power generator park are wind turbine devices. In particular, the wind park 100 of FIG. 1 comprises three wind turbine devices, i.e. a first wind turbine device 102*a*, a second wind turbine device 102*b*, and a third wind turbine device 102*c*. Each wind turbine device 102*a*, 102*b*, 102*c* comprises a switching converter 104 which provides an electrical output power. In accordance with an embodiment, the electrical output power 106 is provided to a device transformer 108 which is part of the respective wind turbine device 102*a*, 102*b*, 102*c*. The device transformer 108 provides at an output thereof a transformed output power 110 which is provided to a grid access point 112 of a grid generally indicated at 114. The coupling of the transformed output power 110 to the grid access point 112 is performed by any suitable means, e.g. a busbar 116.

In accordance with an embodiment, the wind park 100 comprises a central controller 118 for providing a first switching parameter setting 120*a* to the switching converter 104 of the first wind turbine device 102*a*, a second switching parameter setting 120*b* to the switching converter 104 of the second wind turbine device 102*b*, and a third switching parameter setting 120*c* to the switching converter 104 of the third wind turbine device 102*c*. According to an embodiment, the central controller comprises a data processor device 119 for carrying out computer programs and thereby provide the intended functions as described herein.

According to an embodiment, the switching parameter settings 120*a*, 120*b*, 120*c* are provided to the individual switching controllers 104 by discrete connections (not shown in FIG. 1). According to another embodiment, shown in FIG. 1, the switching converters 104 of the wind turbine devices 102*a*, 102*b*, 102*c* are communicatively coupled with the central controller via a network, generally indicated at 122 in FIG. 1. In this way, the network connections between the individual switching devices and the central controller may be used also for other purposes.

In accordance with a further embodiment, the wind park comprises a measuring unit 124 for measuring a harmonic disturbance in an output power of the wind park and providing in response hereto a disturbance signal 126 to the central controller 118. For example, in accordance with an embodiment, the measuring unit 124 is located at or close to the grid access point 112.

In accordance with an embodiment, the central controller 118 is configured for providing the first switching parameter setting 120*a*, the second switching parameter setting 120*b* and the third switching parameter setting 120*c* depending on the disturbance signal 126. In particular, the switching parameter settings 120*a*, 120*b*, 120*c* are provided to reduce the harmonic disturbance in the output power. It should be understood, that for reducing the harmonic disturbance, a suitable temporal coordination of the switching operation of the individual switching converters 104 of the wind turbine devices 102*a*, 102*b*, 102*c* is necessary.

To this end, each wind turbine device 102*a*, 102*b*, 102*c* comprises a GPS receiver 127 (GPS=global positioning system) as a timing unit. The GPS receiver 127 of each wind turbine device receives a common time signal in the form of a GPS signal, indicated at 129 in FIG. 1, from a GPS satellite 131. It should be understood that the GPS satellite 131 is shown only for illustrative purposes and that usually the GPS receiver receives a GPS signal (and hence the common timing signal) from two or more GPS satellites, depending on the location on the earth. The GPS receiver 127 provides in response to the received GPS signal(s) 129 a common time base 133 which allows a desynchronization of the switching parameter settings 120*a*, 120*b*, 120*c* or, in another embodiment, a desynchronization of the switching operation of the switching converters 104.

In accordance with an embodiment, each wind turbine device 102*a*, 102*b*, 102*c* comprises an impedance determination unit 128 for determining an impedance acting on the switching converter 104 of the respective wind turbine. As is shown in FIG. 1, in accordance with an embodiment the impedance determination unit 128 is not necessarily directly located at the switching converter 104 but may be also located in the power path between the output of the switching converter 104 and the busbar 116. In accordance with an embodiment, the central controller 118 is configured for providing the switching parameter settings 120*a*, 120*b*, 120*c* depending on the impedances determined by the impedance determination units 128 of the first wind turbine device 102*a*, the second wind turbine device 102*b* and the third wind turbine device 102*c*, respectively.

In accordance with a further embodiment, the wind park 100 comprises an activity unit 130 for providing an activity signal 132 indicating which wind turbine devices of the wind turbine devices 102*a*, 102*b*, 102*c* are in an active, output power producing state. In accordance with an embodiment, the central controller 118 is configured for providing the switching parameter settings 120*a*, 120*b*, 120*c* depending on the activity signal 132. Depending on the actual implementation, the activity unit 130 may be communicatively coupled (not shown in FIG. 1) with the switching converter 104 of each of the wind turbine device 102*a*, 102*b*, 102*c*.

Further, although some embodiments refer to a "grid" it should be understood that these references are only exemplary and are to be considered to implicitly disclose a respective reference to an electricity network of any type. Also other terms which relate to specific standards or specific implementation techniques are considered to implicitly disclose the respective general term with the desired functionality.

It should further be noted that a entities as disclosed herein (e.g. units and devices) are not limited to dedicated entities as described in some embodiments. Rather, the herein disclosed subject matter may be implemented in various ways and with various granularity on device level while still providing the desired functionality.

According to embodiments of the invention, any suitable component or entity of the power generator park, e.g. the central controller, the timing unit, the measuring unit, the impedance determination unit, the activity unit or the switching converter are at least in part provided in the form of respective computer program products which enable a processor device to provide the functionality of the respective elements as disclosed herein. According to other embodiments, any such component or entity of the power generator park may be provided in hardware. According to other—mixed—embodiments, some components or entities may be provided in software while other components or entities are provided in hardware. Further, it should be noted that a separate component or entity (e.g. module) may be provided for each of the functions disclosed herein. According to other embodiments, at least one component or entity (e.g. a module) is configured for providing two or more functions as disclosed herein.

It should be noted that the term "comprising" does not exclude other elements or steps and on the other hand does not necessarily involve other elements or steps. The term "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

There is provided a power generator park, e.g. a wind park, comprising at least two power generator devices such as wind turbine devices, wherein each power generator device comprises a switching converter for providing an electrical output power. Further, there is provided a central controller for providing switching parameter settings to the switching converters. Each of the at least two power generator devices further comprises a timing unit for receiving a common time signal. The switching converter of each of the at least two power generator devices is configured for controlling at least one switching parameter in response to the respective switching parameter setting with a temporal coordination based on the common time signal.

The invention claimed is:

1. A power generator park, comprising:
   at least two power generator devices including a first power generator device and a second power generator device, wherein each of the power generator devices comprises a switching converter for providing an electrical output power,
   a central controller for providing a first switching parameter setting to the switching converter of the first power generator device and a second switching parameter setting to the switching converter of the second power generator device,
   a measuring unit for measuring a harmonic disturbance in an output power of the power generator park and providing in response hereto a disturbance signal, wherein each of the at least two power generator devices further comprises a timing unit for receiving a common time signal,
   wherein the switching converter of each of the at least two power generator devices is configured for controlling at least one switching parameter in response to the respective switching parameter setting with a temporal coordination based on the common time signal, and
   wherein the central controller is configured for providing the first switching parameter setting and the second switching parameter setting depending on the disturbance signal to thereby reduce the harmonic disturbance in the output power.

2. The power generator park according to claim 1, wherein the timing unit comprises a global positioning system receiver, and wherein a common time base is derived from a common time signal in the form of at least one global positioning signal transmitted by a global positioning system.

3. The power generator park according to claim 1, wherein each power generator device comprises a impedance determination unit for measuring an impedance acting on the switching converter of the power generator device, and
   the central controller is configured for providing the switching parameter settings to each of the at least two power generator devices depending on the impedance acting on its switching converter.

4. The power generator park according to claim 1, further comprising:
   an activity unit for providing an activity signal indicating which power generator devices of the at least two power generator devices are in an active, output power producing state,
   wherein the central controller is configured for providing the switching parameter settings depending on the activity signal.

5. The power generator park according to claim 1, wherein the switching converter is a frequency switching converter.

6. The power generator park according to claim 1, wherein the power generator park is a wind park and each power generator device is a wind turbine device.

7. A method of operating a central controller of a power generator park, the power generator park comprising at least two power generator devices including a first power generator device and a second power generator device, wherein each power generator device comprises a switching converter for providing an electrical output power, the method comprising:
   providing a first switching parameter setting for the switching converter of the first power generator device and a second switching parameter setting for the switching converter of the second power generator device, wherein the switching parameter settings include a reference to a common time base;

receiving a disturbance signal indicative of a harmonic disturbance in an output power of the power generator park; and providing the first switching parameter setting and the second switching parameter setting depending on the disturbance signal to thereby reduce the harmonic disturbance in the output power.

8. The method according to claim 7, further comprising:

receiving for each of the at least two power generator devices an impedance signal indicative of an impedance acting on the switching converter of the power generator device, and providing the switching parameter settings depending on the impedance acting on the switching converters of the at least two power generator devices.

9. The method according to claim 7, further comprising:

receiving an activity signal indicating which power generator devices of the at least two power generator devices are in an active, output power producing state, and providing the switching parameter settings depending on the activity signal.

10. A non-transitory computer-readable medium storing therein a computer program that causes a data processor device to execute instructions for providing a switching parameter setting for controlling a method of operating a central controller of a power generator park, the power generator park comprising at least two power generator devices including a first power generator device and a second power generator device, wherein each power generator device comprises a switching converter for providing an electrical output power, the method comprising: comprising: providing a first switching parameter setting for the switching converter of the first power generator device and a second switching parameter setting for the switching converter of the second power generator device, wherein the switching parameter setting include a reference to a common time base; receiving a disturbance signal indicative of a harmonic disturbance in an output power of the power generator park; and providing the first switch parameter setting and the second switching parameter setting depending on the disturbance signal to thereby reduce the harmonic disturbance in the output power.

\* \* \* \* \*